(12) United States Patent
Wellnitz

(10) Patent No.: US 8,198,837 B1
(45) Date of Patent: Jun. 12, 2012

(54) DEVICE AND METHOD FOR MEASURING AND CONTROLLING THE SPEED AND TORQUE OF A DC MOTOR

(75) Inventor: Jason Wellnitz, Sussex, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 388 days.

(21) Appl. No.: 12/623,825

(22) Filed: Nov. 23, 2009

(51) Int. Cl.
*H02P 1/00* (2006.01)
*H02P 7/00* (2006.01)

(52) U.S. Cl. ............... 318/257; 318/400.02; 318/400.09; 318/432; 318/757; 318/802; 322/20; 322/28

(58) Field of Classification Search .................. 318/257, 318/400.02, 400.09, 432, 757, 801–803; 322/20, 28
See application file for complete search history.

(56) References Cited

U.S. PATENT DOCUMENTS

| | | | |
|---|---|---|---|
| 4,281,276 A * | 7/1981 | Cutler et al. ................. | 318/803 |
| 4,450,398 A | 5/1984 | Bose | |
| 4,804,067 A | 2/1989 | Kahkipuro | |
| 4,821,276 A | 4/1989 | Alphonse et al. | |
| 4,845,418 A | 7/1989 | Conner | |
| 5,530,343 A | 6/1996 | Bowers, III et al. | |
| 6,087,796 A | 7/2000 | Canada et al. | |
| 6,184,648 B1 | 2/2001 | Kato et al. | |
| 6,407,531 B1 | 6/2002 | Walters et al. | |
| 6,586,914 B2 * | 7/2003 | Garrigan et al. ................. | 322/28 |
| 6,859,018 B2 * | 2/2005 | Garrigan et al. ................. | 322/28 |
| 6,870,350 B2 * | 3/2005 | Garrigan et al. ................. | 322/28 |
| 7,830,106 B2 * | 11/2010 | Fukuchi et al. ................. | 318/432 |
| 2003/0094917 A1 * | 5/2003 | Garrigan et al. ............. | 318/700 |
| 2003/0197490 A1 * | 10/2003 | Garrigan et al. ................. | 322/20 |
| 2003/0205989 A1 * | 11/2003 | Garrigan et al. ................. | 322/28 |
| 2006/0055363 A1 * | 3/2006 | Patel et al. ..................... | 318/757 |
| 2007/0267990 A1 | 11/2007 | Abolhassani et al. | |
| 2008/0030163 A1 * | 2/2008 | Fukuchi et al. ................. | 318/801 |
| 2008/0048607 A1 * | 2/2008 | Kono ............................ | 318/802 |
| 2009/0295316 A1 * | 12/2009 | Patel et al. ............... | 318/400.02 |
| 2010/0090629 A1 * | 4/2010 | Tang ........................ | 318/400.09 |

* cited by examiner

*Primary Examiner* — Paul Ip
(74) *Attorney, Agent, or Firm* — Waddey & Patterson, P.C.; Mark J. Paterson

(57) ABSTRACT

A DC motor control device calculates motor speed using determinations of motor field flux and armature voltage in the motor. The device includes a control module having one or more control inputs and one or more control outputs. At least one control input is configured to receive data representing field current measured in the DC motor. The control module includes flux curve logic that is responsive to measurements of motor field current to calculate a field flux in the motor. The flux curve logic uses a flux curve stored in the control module, the flux curve representing a functional relationship between field current and field flux in the motor. The flux curve is defined by a plurality of flux curve data points corresponding to a plurality of motor field currents within a lower current range and within an upper current range. The flux curve is further defined by at least a first flux curve line positioned within the lower current range and a second flux curve line positioned within the upper current range.

15 Claims, 11 Drawing Sheets

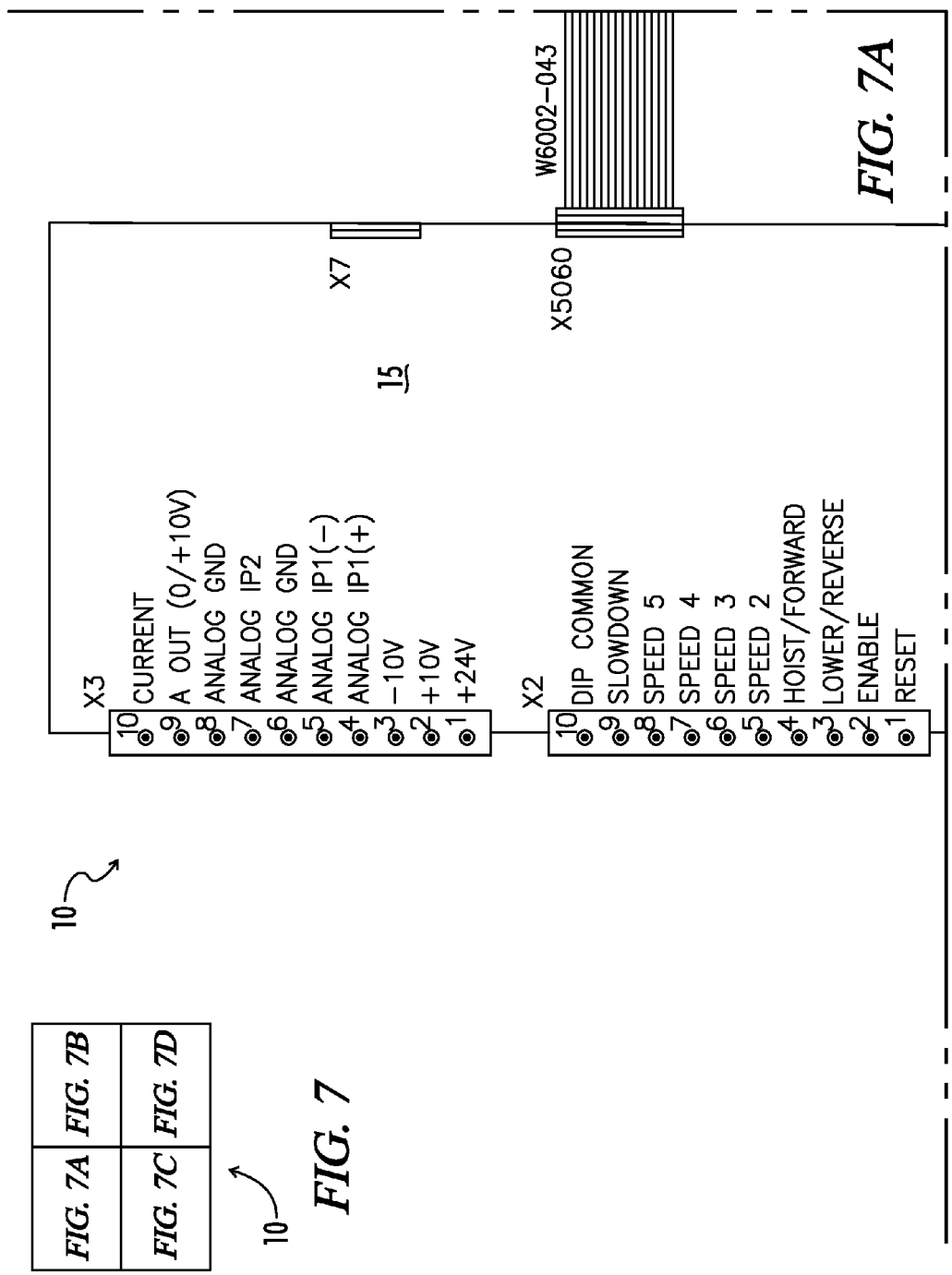

DEVICE AND METHOD FOR MEASURING AND CONTROLLING THE SPEED AND TORQUE OF A DC MOTOR

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention generally relates to DC motor control devices and methods. More particularly, the present invention pertains to devices and methods for controlling a DC motor in which motor speed is calculated using motor field flux and armature voltage parameters.

Conventional DC motor controllers are often used to control the speed and torque of the motor under various operation conditions. Typically this requires the use of a control loop that depends on an accurate determination of motor speed. In many DC motor controllers, motor speed is calculated using measurements of the motor field flux and armature voltage.

Although it is easy to measure the armature voltage in an operating DC motor, motor field flux cannot easily be measured directly. Consequently, many conventional motor control systems approximate the motor field flux by measuring the field current and then applying that current measurement to a pre-determined field current vs. flux curve. However, if the flux parameter that is approximated by the control system does not match the actual motor field flux, motor velocity oscillations occur. This mismatch between calculated and actual flux can arise in a conventional control system because the field current to flux curve is unique for each motor, varying according to time, motor size, and manufacturer. These unwanted motor velocity oscillations often occur under light motor loads when it is desirable to operate the motor under a weakened field. A field is weakened to conserve energy, prolong motor life, and operate above base speed. If the motor cannot maintain a consistent velocity under weakened field conditions, the end user will not be able to take advantage of the field weakening features.

What is needed, then, is a device and method that provides a more stable control of the speed of a DC motor by closely matching a calculated motor flux to the actual field flux in the motor.

BRIEF SUMMARY OF THE INVENTION

The present invention minimizes velocity oscillations that occur when DC motor speed is calculated using motor field flux and armature voltage. In accordance with one embodiment of the invention, a flexible flux curve is implemented in the motor control device that is intended to be tuned for each motor in the field. The flux curve is calculated using three user-defined points at 25%, 75% and 200% of rated motor field current. Those three points are used to calculate two flux curve lines. One flux curve line is positioned between 25% and 75% of rated motor field current. The second flux curve line is positioned between 75% and 200% of rated motor field current. Two flux curve lines are used because a typical motor field flux curve exhibits a "knee" at the field saturation point. To make the curve more flexible and to more closely approximate the motor's actual flux curve, the 75% field current can be varied by the user.

The present invention allows for more accurate calculations of DC motor speed and torque, while accounting for each motor's unique performance characteristics.

Thus, the present invention uses a flux curve that is flexibly adapted (tuned) for each motor in the field. This flux curve is constructed from user-defined points at different rated field currents (e.g., 25%, 75%, and 200%). These points are then used to calculate two flux curve lines, one between the two lower rated currents and one between the two upper rated currents. This allows the motor control system to perform a more accurate calculation of motor speed and torque, using characteristics of the actual motor being controlled.

DETAILED DESCRIPTION OF THE INVENTION

Figures 6, 6A:
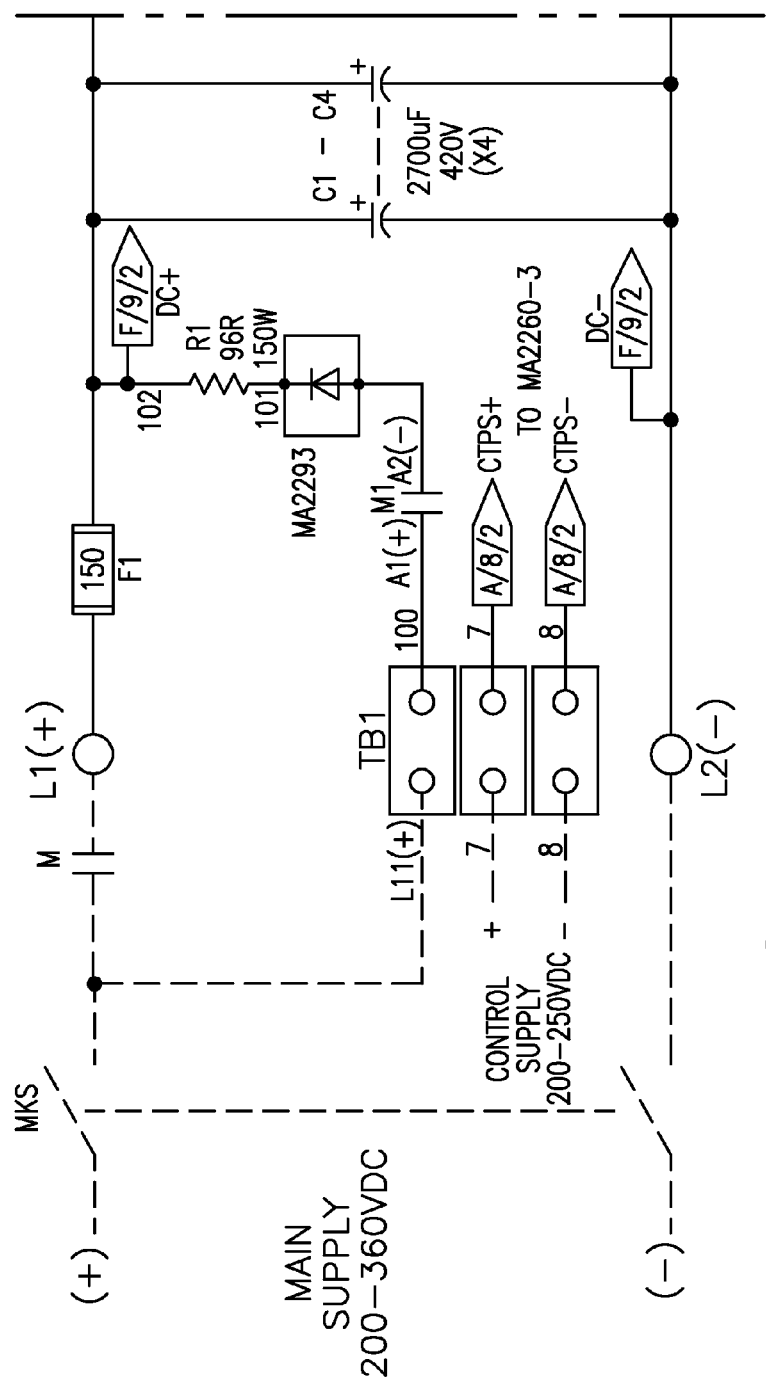
FIG. 6 is a schematic diagram of a motor power circuit coupled to a DC motor.
Figure 6B:
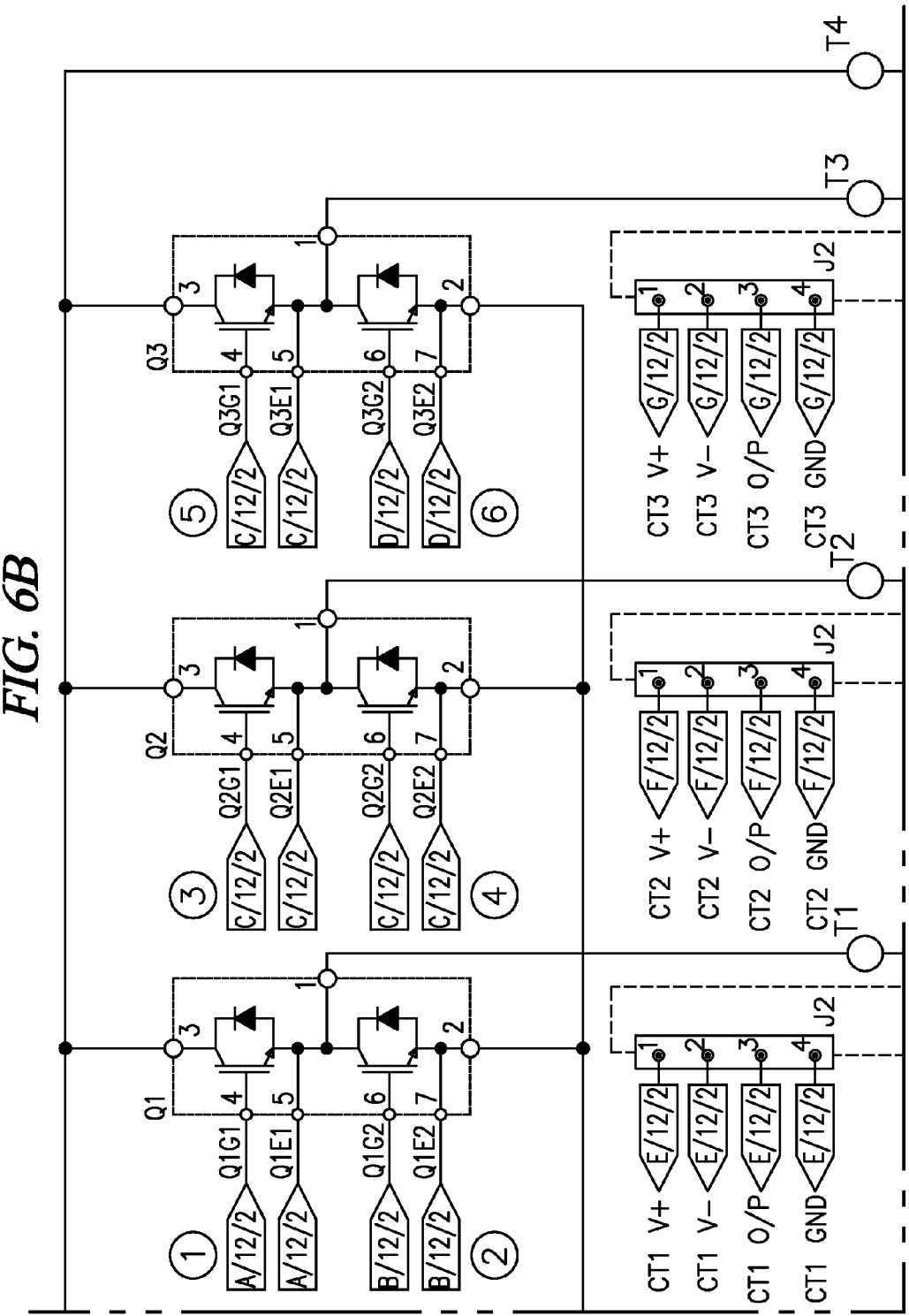
Figure 6C:
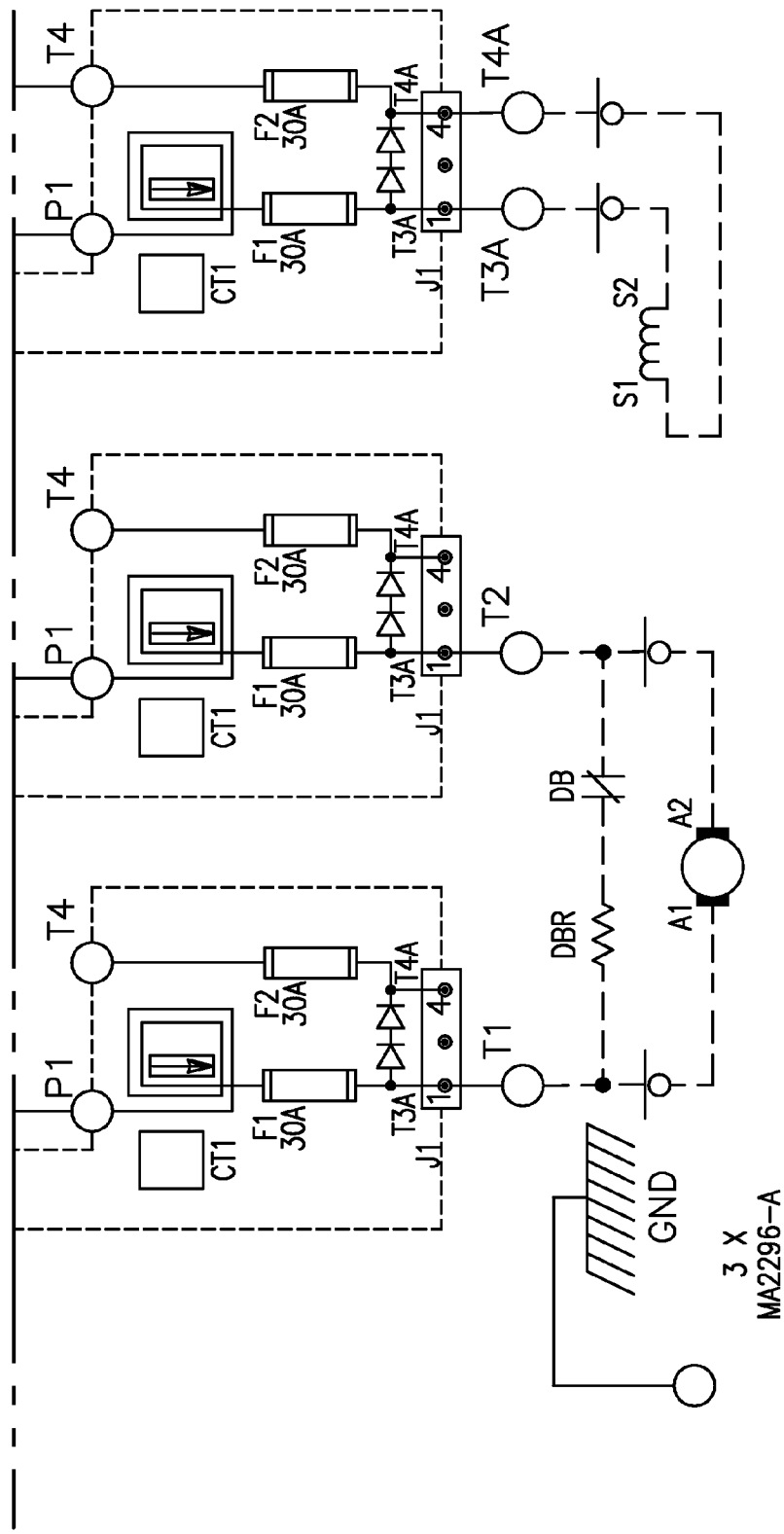
Figure 7B:
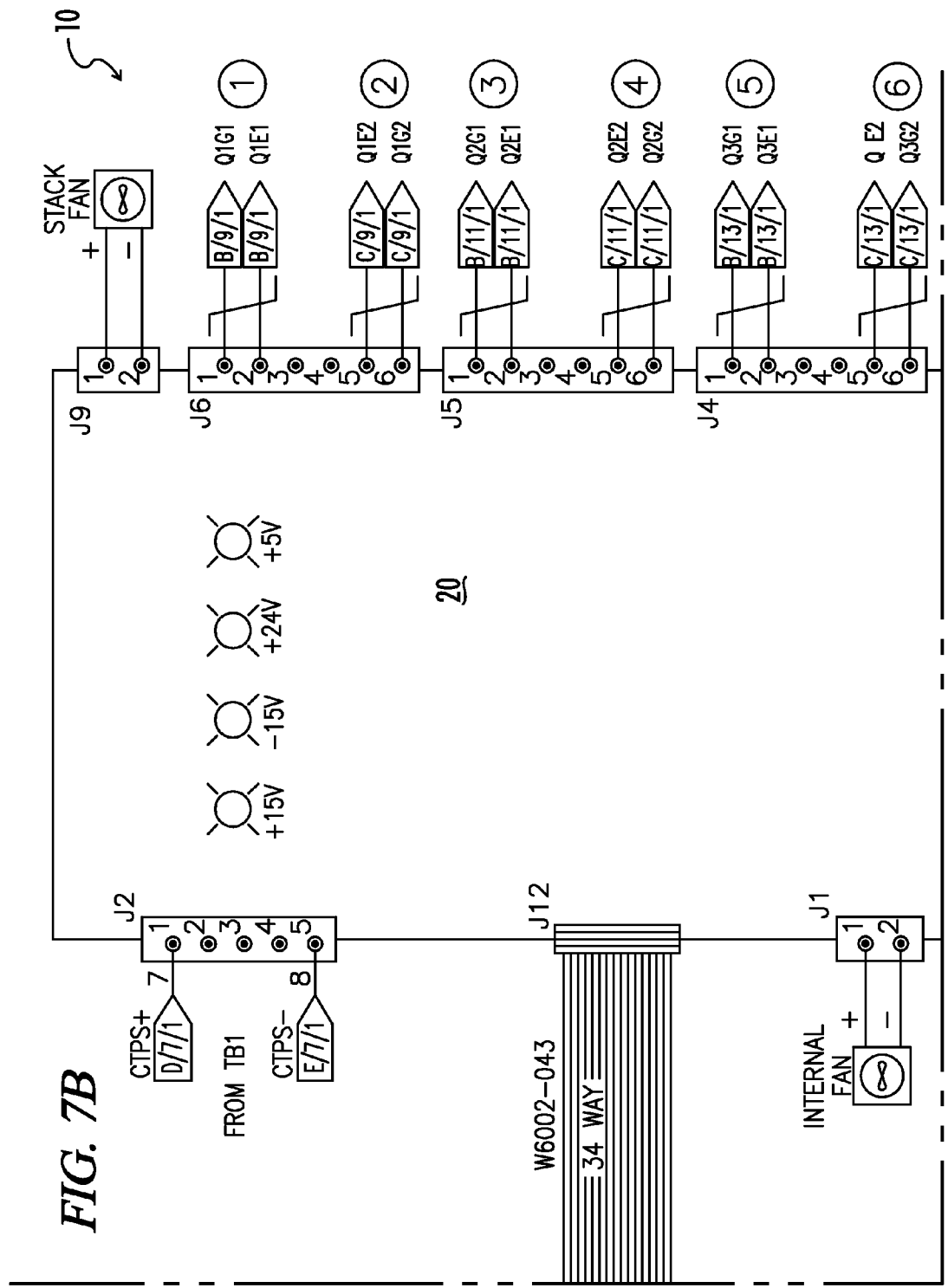
FIG. 7 is a block diagram of a DC motor control device configured for providing motor control signals to the motor power circuit of FIG. 6.
Figure 7C:
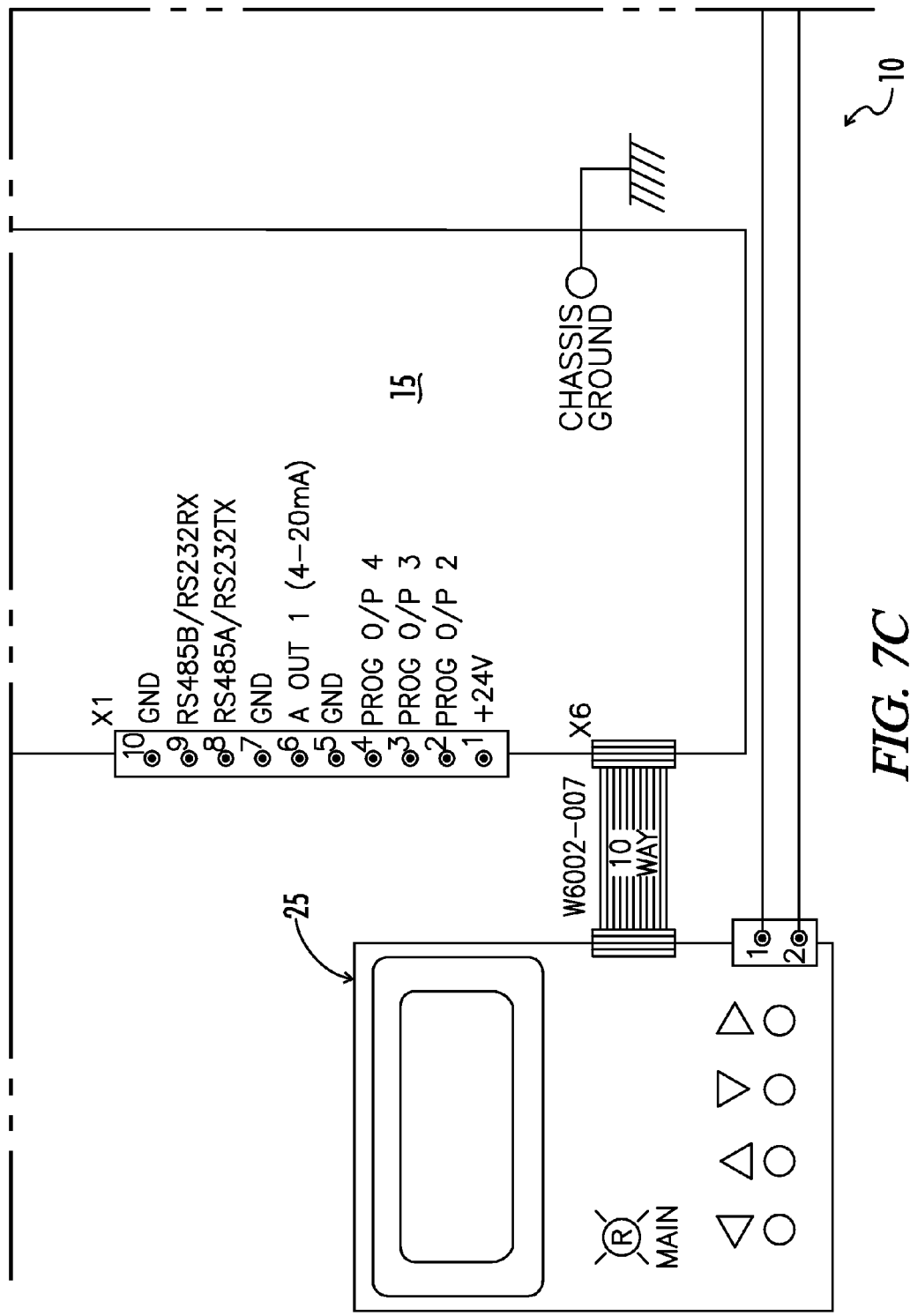
Figure 7D:
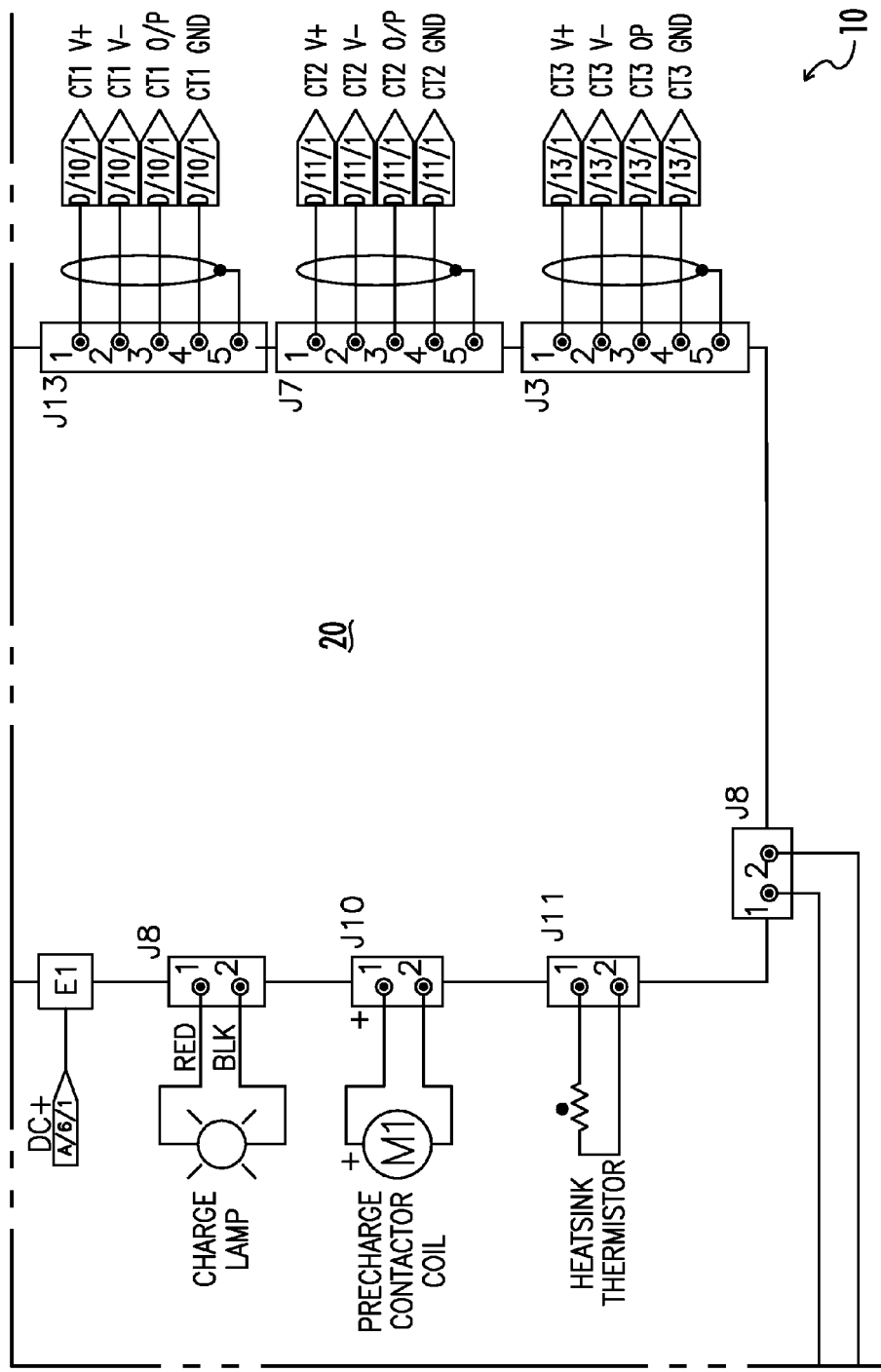

Referring first to FIGS. 6 and 7, one embodiment of a DC motor control device 10 is shown. The motor control device 10 includes a control module 15 operatively coupled to a driver module 20. The control module 15 and driver module 20 have control inputs that are coupled to a user control and display device 25. The control module 15 conventionally includes a microprocessor, microcontroller, or other logic unit that is programmed to provide motor control commands to the driver module 20 at one or more control outputs. The driver module 20 receives and processes the control commands from the control module 15. In response to the motor control commands, the driver module 20 provides motor control signals at driver outputs 1-6 (FIG. 6).

As shown on FIG. 6, the driver outputs 1-6 are conventionally coupled to power switch modules Q1, Q2, and Q3 in a motor power circuit 30. The power switch modules Q1, Q2, and Q3 respond to the motor control signals to provide the voltage and current needed to power a DC motor. In this embodiment, the motor armature terminals A1 and A2 are connected to the outputs of power switch modules Q1 and Q2 through connector blocks T1 and T2. The motor field winding terminals S1 and S2 are connected to the output of power switch module Q3 through connector block T3/T4.

As also shown on FIGS. 6 and 7, connector blocks T1, T2, and T3/T4 each include respective voltage, data, and ground terminals (V+, V−, O/P, GND) connected to corresponding terminals on driver module 20.

Figure 5:
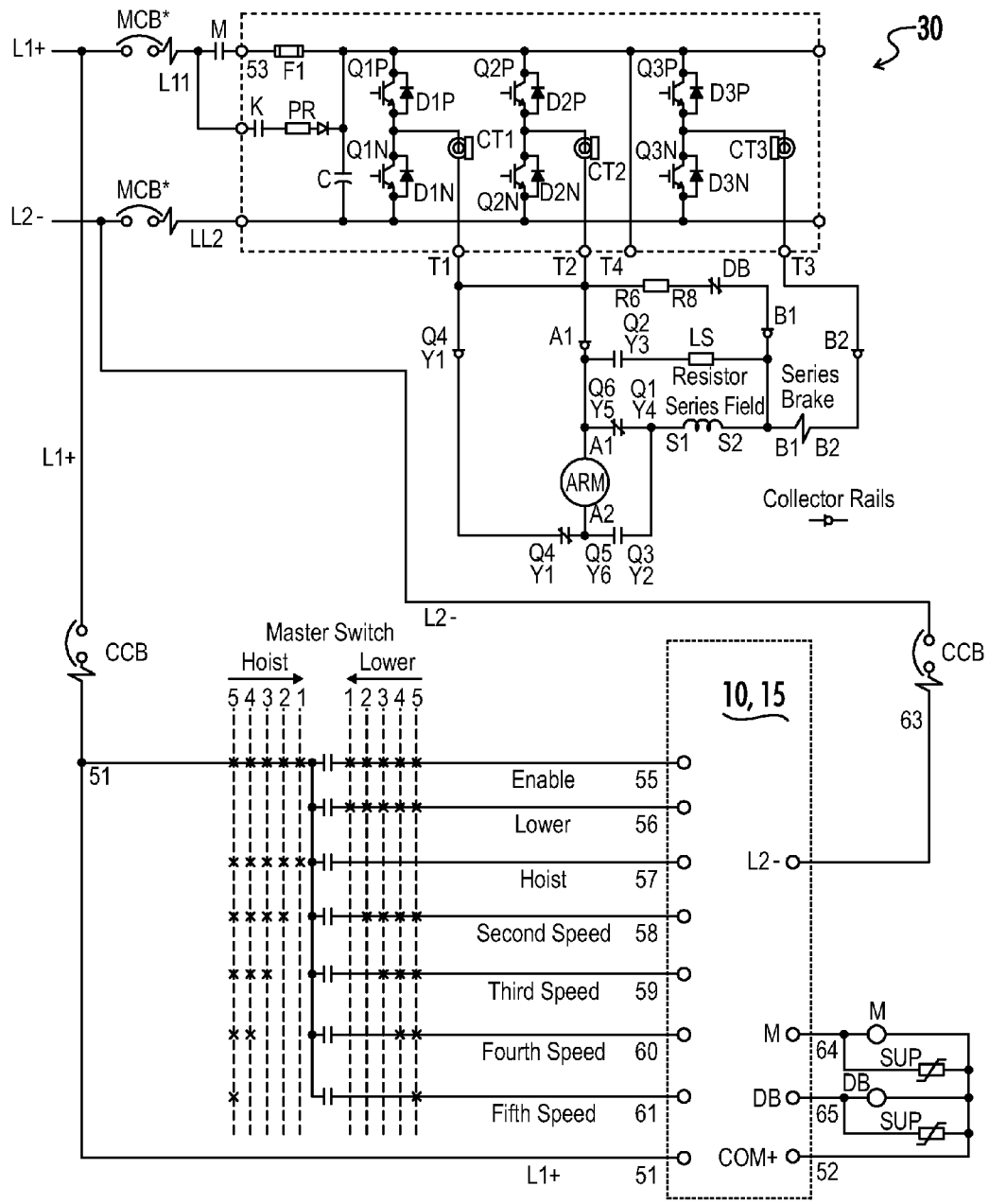
FIG. 5 is a schematic and block diagram of one embodiment of a DC motor controller configured to operate a hoist motor.

FIG. 5 shows an embodiment of the present invention configured to control a DC hoist motor. In this embodiment, the motor control device 10 has a series of control inputs 55-61 connected to a Master Switch that allows the hoist operator to lift or lower the hoist at five selectable speeds. The control module 15 is further coupled to the motor power circuit 30 positive and negative rails at L1 and L2 and to the power switch modules Q1, Q2, and Q3 as explained above with reference to FIGS. 6 and 7.

Figure 4:
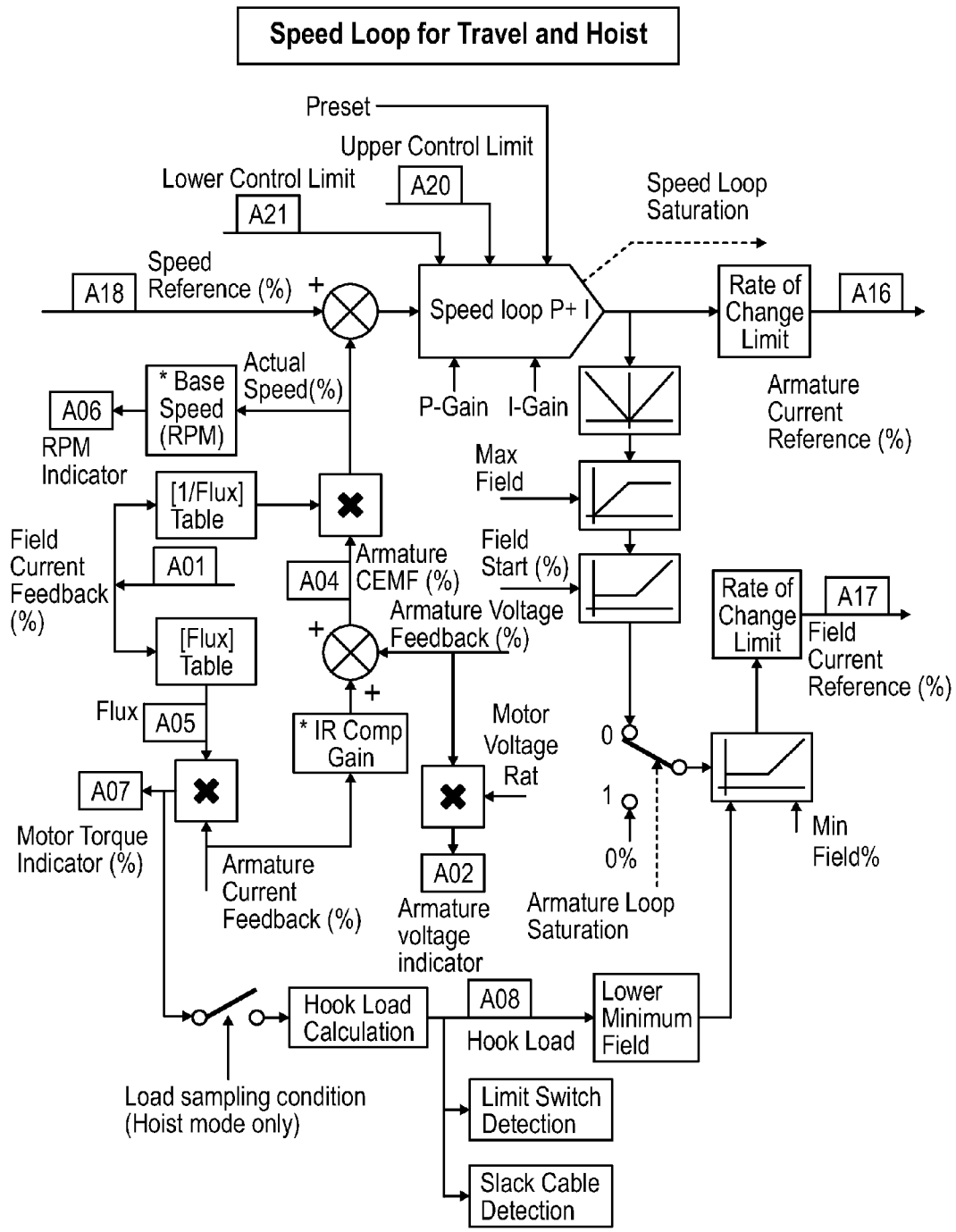
FIG. 4 is a schematic and block diagram of a control loop used to control the speed of a DC motor powering a travel and hoist apparatus.

In one embodiment, the logic unit in control module 15 of FIG. 5 is programmed to operate in different hoist modes and in accordance with different operational parameters. The control module 15, and the logic unit in particular, are operatively coupled to the control inputs to receive and respond to user commands and to changes in operational parameters. Using conventional programming techniques known to those of skill in the art, the control module is programmed to respond to user commands and to the operational parameters, and to provide corresponding motor control commands at control module outputs. The combination of inputs, outputs, operational motor parameters, and programming in the control module 15 can then define a motor speed control loop, one example of which is shown in FIG. 4. Thus, in one embodiment, at least one control input on the control module receives data representing measurement of motor field current. Another control input receives data representing measurement of armature voltage.

Exemplary parameters (D00-D23) used by one embodiment of the invention are summarized in Table 1 below which includes the parameter name/type, the default parameter setting, the parameter operational range, and the unit of measurement. FIG. 4 graphically illustrates one embodiment of a DC motor control loop for travel and hoist motions that can be programmed into control module 15 of FIG. 5, using the parameters shown in Table 1

TABLE 1

Group D Parameters

| Parameter # | Parameter Name | Factory Default | Min. Max. | Unit |
|---|---|---|---|---|
| D00 | Motor Rated Armature Current | 1/2 CO2 Value | 1 2000 | 1 A |
| D01 | Motor Rated Volts | 230 | 200-360 200-720 | 1 V |
| D02 | Motor Base Speed | 400 | 0 5000 | 1 RPM |
| D03 | Motor Field Current | 0 | 0 C06 CT Rtg | 1.0 A |
| D04 | Current Limit FWD | 125% | 100 200 | 0.1% |
| D05 | Current Limit REV | 100% | 25 100 | 0.1% |
| D06 | Armature/Field | 1.5 | 1.1 | 0.1 |

TABLE 1-continued

Group D Parameters

| Parameter # | Parameter Name | Factory Default | Min. Max. | Unit |
|---|---|---|---|---|
| D20 | 3-Pt Flux Curve | Disabled | 3.0 0 = Disabled 1 = Enabled | 1 |
| D21 | Flux 25 IF | 53.8% | 0% 100% | 0.1% |
| D22 | Flux 75 IF | 93.5% | 0% 125% | 0.1% |
| D23 | Flux 200 IF | 117.9% | 0% 150% | 0.1% |

With particular reference to the present invention, the operational parameters used by the control module 15 include DC motor parameters D00-D06, including field current and armature voltage. Four parameters, D20-D23, are used to select a flux-field current curve that calculates motor speed and torque. Each DC motor has a unique flux-field current curve that represents a functional relationship between field current and field flux in the motor. Deviations from that curve can cause velocity oscillations. To minimize these oscillations a flux-field curve is enabled in the control module 15 via parameter D20 and modified using parameters D21-D23. The flux-field curve is calculated based on separate first and second flux curve lines using the basic formula $y=mx+b$. In one embodiment, the flux curve is calculated using three user-defined points at 25%, 75% and 200% of rated motor field current.

Figure 1:
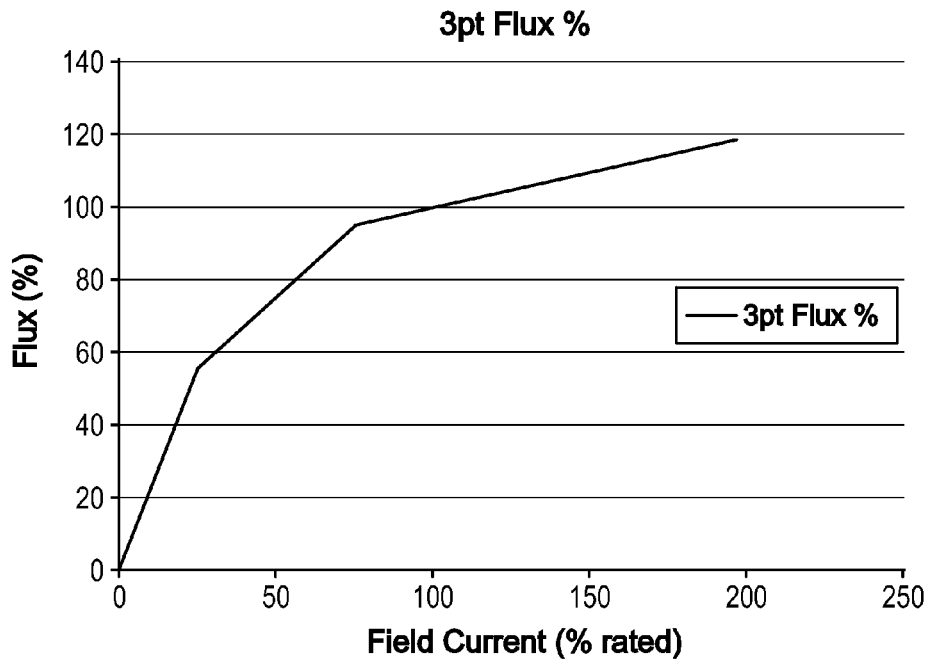
FIG. 1 is a graph of a motor flux field current curve generated using a three-point approximation method in accordance with the present invention.
Figure 2:
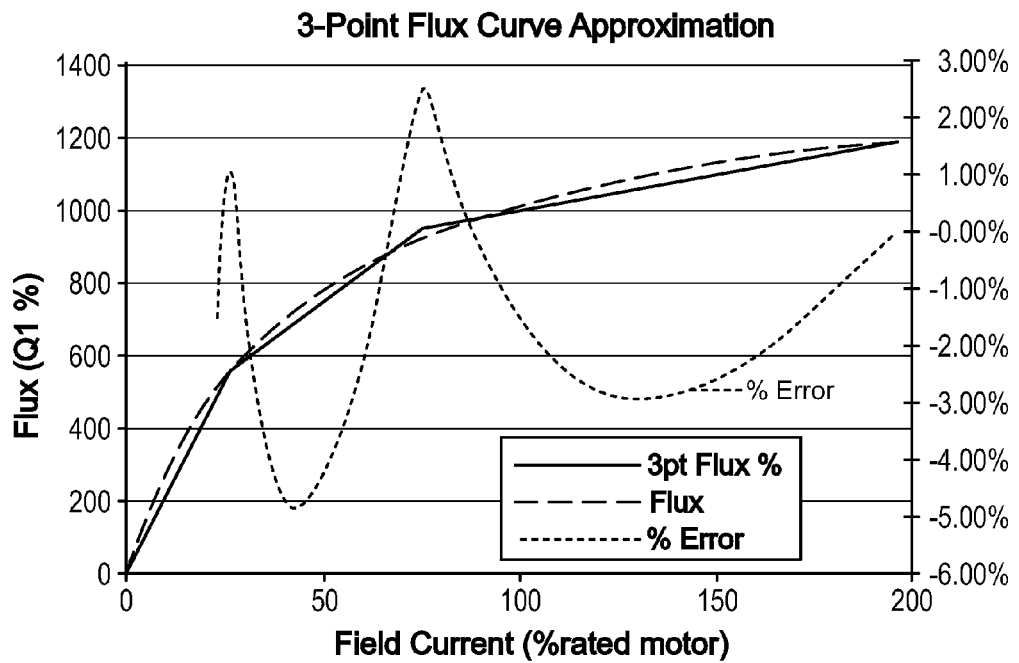
FIG. 2 is a graph showing a motor field flux curve approximated using the method of the present invention, plotted against the actual motor field flux and further showing the approximation error.

The first flux curve line is positioned between 25% of rated motor field current and 75% of rated field current. The second flux curve line is positioned between 75% of rated field current and 200% of rated field current. As parameters D21-D23 are changed, so are the slopes and y-intercepts of the two flux curve lines. One example of a flux-field current curve calculated using default values is shown in FIG. 1. FIG. 2 is a graph showing a motor field flux curve approximated using the method of the present invention, plotted against the actual motor field flux curve. Also shown is the flux approximation error percentage.

In the embodiment of FIG. 5, when the three-point flux curve is disabled (using parameter D20), a pre-programmed flux curve is used. This setting can be acceptable for many mill-duty DC motors. However, when parameter D20 is set to enable a three-point flux curve, the curve is calculated using parameters D21, D22 and D23. In one embodiment, the default settings of parameters D21-D23 can be programmed to closely approximate the pre-programmed flux-field current curve.

Figure 3:
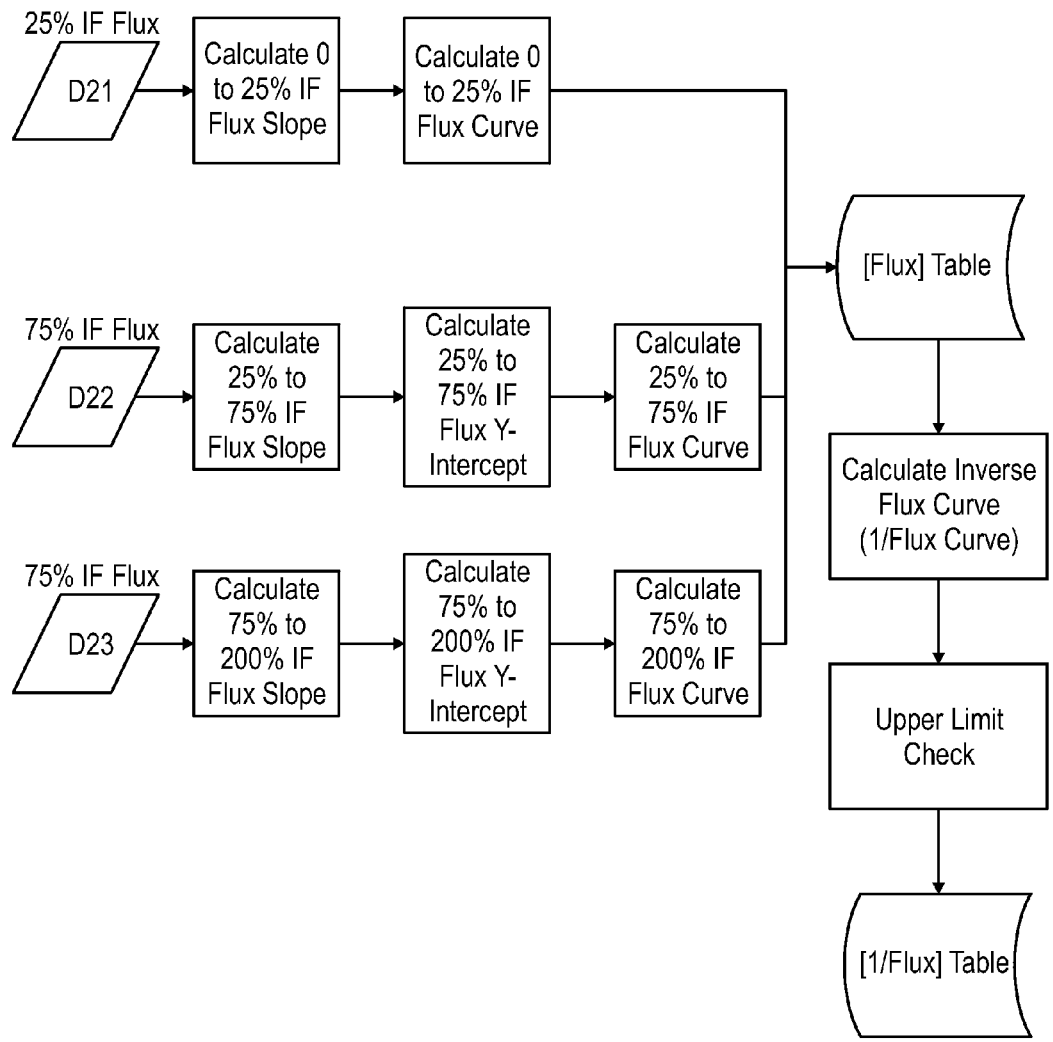
FIG. 3 is a flow chart of one embodiment of the DC motor control method of the present invention.

FIG. 3 illustrates the steps programmed and used in the control module 15 to calculate a three-point flux-field current curve in accordance with one embodiment of the present invention. In this embodiment, parameter D21 is used to select the percentage flux at 25% field current. Parameter D22 is used to select the percentage flux at 75% field current. Parameter D23 is used to select the percentage flux at 200% field current. The flux curve calculations are stored in a Flux Table. An inverse flux curve is then calculated, followed by a check to determine if any upper limits have been exceeded. The inverse flux curve calculations are then stored in an Inverse Flux table.

In some embodiments, an inverse flux curve is calculated once because of limitations in computer mathematical execution times. For example, division operations in a computer can slow down processing time. Therefore, in some embodiments, the control method calculate the inverse of flux tables once and uses the inverse table to multiply when operating through the device speed loop. As can be seen from FIG. 4, the flux table feeds into A05 (Flux), then is multiplied by the measured armature current to calculate A07 (Calculated Motor Torque). Similarly, the inverse flux table is multiplied by A04 (measured armature counter electro-motive force) to provide the measured speed. The measured speed feeds the A06 (calculated RPM indicator) and speed PI loop.

FIG. 4 generally shows how the flux curve and inverse flux curve relate to one embodiment of a motor speed control loop. Table 2 below describes the motor current and voltage parameters monitored in the control loop. Table 3 below describes the motor speed and torque calculations performed in the control loop. Table 4 below describes the motor current and speed parameters monitored in the control loop. The variable numbers A00-A20 in Tables 2, 3, and 4 correspond to the variable labels referenced in FIG. 4.

TABLE 2

| Variable Number | Name | Function | Unit |
|---|---|---|---|
| A00 | Armature Current | Displays the value of motor armature current derived from controller terminal T1 current measurement. | 0.1 A |
| A01 | Field Current | Displays the value of motor field current derived from controller terminal T3 measurement. | 0.1 A |
| A02 | Armature Voltage | Displays the value of the armature voltage measurement derived from controller terminals T1 and T2. | 0.1 V |
| A03 | DC Bus Voltage | Displays the voltage on the controller DC bus capacitors. | 0.1 V |

TABLE 3

| Variable Number | Name | Function | Unit |
|---|---|---|---|
| A04 | Motor CEMF | Displays the motor counter EMF as a percentage of the motor rated voltage. 100% = D01 value | 0.1% |
| A05 | Flux | Calculated motor flux as percentage of the full-field value. | 0.1% |
| A06 | Motor RPM | Calculated motor speed in RPM. | 1 RPM |
| A07 | Motor Torque | Displays the calculated motor torque (% Flux × % Arm I) as a percentage. | 0.1% |
| A08 | Hook Load | Displays calculated hook load in % for Hoist Configuration Only | 0.1% |

TABLE 4

| Variable Number | Name | Function | Unit |
|---|---|---|---|
| A16 | Armature Current Ref (Advanced Tool) | Displays the armature calculated current reference as a percentage of the motor rated current. | 0.1% |
| A17 | Field Current Ref (Advanced Tool) | Displays the field calculated current reference as a percentage of motor rated current. | 0.1% |
| A18 | Speed Reference (Advanced Tool) | Displays the calculated speed reference before and after acceleration and deceleration control as a percentage of the motor rated speed at full load. | 0.1% |
| A19 | Upper Control Limit (Advanced Tool) | Displays the forward current limit applied to the speed controller. | 0.1% |
| A20 | Lower Control Limit (Advanced Tool) | Displays the reverse current limit applied to the speed controller. | 0.1% |

Motor velocity oscillations are most common above base motor speed in many DC mill motors. Preferably, tuning of the flux-field current curve should occur at five or six speed references between 120% and 170% of motor base speed to provide smooth motor acceleration. This can be important if the minimum field is set below 50.0%.

To initiate tuning of the flux-field curve in the embodiment of FIG. 5, the minimum motor field current is set to 75% of rated. A motor run command is executed to set a speed reference above base speed for an unloaded (or lightly loaded) motor. If velocity oscillations occur at any motor speed, parameter D22 is moved down in 2.0% increments. If the motor speed still oscillates, parameter D22 is adjusted in increments of 2.0% upward from the default value.

After parameter D22 is selected to provide the minimum velocity oscillation, the minimum field current is set to 25% of rated. Parameter D21 is then adjusted as described for parameter D22. After the motor velocity oscillations have been minimized at 25% field current, the operator should verify that oscillations do not occur at various speeds above the motor base speed.

In some embodiment, parameter D23 may be least critical above motor base speed, but it can be used to increase the accuracy of speed regulation during for heavy motor loading, e.g., at field currents greater than 50.0% of rated. Preferably, parameters D21-D23 should not need to be adjusted by more than 20% from their default value.

Thus, although there have been described particular embodiments of the present invention of a new and useful device and method for measuring and controlling the speed and torque of a DC motor, it is not intended that such references be construed as limitations upon the scope of this invention except as set forth in the following claims.

What is claimed is:

1. A device for controlling the speed of a DC motor, wherein the speed of the DC motor is calculated in the device using determinations of motor field flux and armature voltage in the motor, the device comprising:

a control module having one or more control inputs and one or more control outputs;

at least one control input is configured to receive data representing field current measured in the DC motor;

the control module includes flux curve logic that is responsive to measurements of motor field current to calculate a field flux in the motor, the flux curve logic using a flux curve stored in the control module, the flux curve representing a functional relationship between field current and field flux in the motor;

wherein the flux curve is defined by a plurality of flux curve data points corresponding to a plurality of motor field currents within a lower current range and within an upper current range; and wherein the flux curve is further defined by at least a first flux curve line positioned within the lower current range and a second flux curve line positioned within the upper current range.

2. The device of claim 1, wherein the flux curve is defined by three flux curve data points.

3. The device of claim 2 wherein the flux curve data points are selectable by a user of the device.

4. The device of claim 2 wherein the flux curve data points correspond to approximately 25%, 75% and 200% of rated motor field current.

5. The device of claim 4 wherein the first flux curve line is positioned between 25% and 75% of rated motor field current and the second flux curve line is positioned between 75% and 200% of rated motor field current.

6. The device of claim 1 further comprising a driver module having driver inputs operatively coupled to the control outputs and driver outputs, the control module is functional to provide motor control commands at the control outputs, and the driver module is responsive to the motor control commands to generate motor control signals at the driver outputs.

7. The device of claim 6 further comprising a power circuit operatively coupled to the driver outputs, the power circuit responsive to the motor control signals to provide operational voltage and current for a DC motor.

8. The device of claim 3, further comprising:
default values for flux curve data points stored in the control module; and
logic in the control module to allow the user to increment the value of at least one of the flux curve data points upward or downward from the default value to reduce velocity oscillations in the motor.

9. A method of using a motor control device to control the speed of a DC motor comprising:
defining a flux curve representing a functional relationship between field current and field flux in the motor using a plurality of flux curve data points stored in the motor control device;
using the motor control device to operate the motor at a defined minimum field current;
monitoring for oscillations in the speed of the motor;
adjusting a value of at least one of the stored flux curve data points to reduce oscillations in the speed of the monitor;
storing the adjusted value of the flux curve data point to modify the flux curve defined in the motor control device;
measuring the field current during operation of the motor by the motor control device;
using the measured field current and the defined flux curve to calculate a field flux in the motor;
using the calculated field flux to determine the speed of the motor.

10. The method of claim 9 wherein the step of defining the flux curve further comprises using at least three flux curve data points two define a first flux curve line in a lower current range and a second flux curve line in an upper current range.

11. The method of claim 10 wherein the flux curve data points correspond to approximately 25%, 75% and 200% of rated motor field current.

12. The method of claim 11 wherein the first flux curve line is positioned between approximately 25% and 75% of rated motor field current and the second flux curve line is positioned between approximately 75% and 200% of rated motor field current.

13. The method of claim 12 wherein the steps of using the motor control device to operate the motor at a defined minimum field current, monitoring for oscillations in the speed of the motor, and adjusting a value of at least one of the stored flux curve data points to reduce oscillations in the speed of the monitor further comprise:
defining a first motor control input parameter for setting the 25% of field current data point;
defining a second motor control input parameter for setting the 75% of field current data point;
defining a third motor control input parameter for setting the 200% of field current data point;
setting a minimum motor field current at approximately 75% of rated field current;
operating the motor at a speed reference above a base motor speed using default values for the first, second, and third motor control input parameters;
adjusting the value of the second motor control input parameter in increments to reduce oscillations in motor speed; and
using the adjusted value of the second motor control input parameter to modify the flux curve stored in the motor control device.

14. The method of claim 13 further comprising:
setting the minimum motor field current at approximately 25% of rated field current;
operating the motor at a speed reference above a base motor speed using default values for the first, second, and third motor control input parameters;
adjusting the value of the first motor control input parameter in increments to reduce oscillations in motor speed; and
using the adjusted value of the first motor control input parameter to modify the flux curve stored in the motor control device.

15. The method of claim 14 further comprising adjusting the value of the third motor control input parameter in increments to reduce oscillations in motor speed; and using the adjusted value of the third motor control input parameter to modify the flux curve stored in the motor control device.

* * * * *